United States Patent
Ho

(10) Patent No.: US 8,155,471 B2
(45) Date of Patent: Apr. 10, 2012

(54) IMAGE PROCESSING APPARATUS AND METHOD THAT MAY BLUR A BACKGROUND SUBJECT TO HIGHLIGHT A MAIN SUBJECT

(75) Inventor: Wen-Cheng Ho, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 861 days.

(21) Appl. No.: 12/205,921

(22) Filed: Sep. 8, 2008

(65) Prior Publication Data

US 2009/0297057 A1 Dec. 3, 2009

(30) Foreign Application Priority Data

May 27, 2008 (TW) ................................ 97119530 A

(51) Int. Cl.
*G06K 9/40* (2006.01)
*G06K 9/00* (2006.01)
(52) U.S. Cl. ........................ 382/264; 382/260
(58) Field of Classification Search .................. 382/164, 382/173, 190, 260–264, 298, 300; 345/441, 345/581, 606, 611, 613
See application file for complete search history.

(56) References Cited

U.S. PATENT DOCUMENTS

| | | | | |
|---|---|---|---|---|
| 5,642,437 A * | 6/1997 | Laczko et al. | ................ | 382/246 |
| 5,715,317 A * | 2/1998 | Nakazawa | ...................... | 381/17 |
| 6,624,823 B2 * | 9/2003 | Deering | ......................... | 345/613 |
| 6,747,663 B2 * | 6/2004 | Oberoi et al. | ................. | 345/606 |
| 6,947,057 B2 * | 9/2005 | Nelson et al. | ................. | 345/611 |
| 7,236,839 B2 * | 6/2007 | Fujita et al. | ...................... | 700/94 |
| 7,953,298 B2 * | 5/2011 | Kuraki et al. | ................. | 382/300 |
| 2004/0125003 A1 * | 7/2004 | Craven et al. | ................... | 341/76 |

FOREIGN PATENT DOCUMENTS

CN 1720720 1/2006

OTHER PUBLICATIONS

"First Office Action of China Counterpart Application", issued on Sep. 20, 2010, p. 1-p. 10, in which the listed reference was cited.

* cited by examiner

*Primary Examiner* — Amir Alavi
(74) *Attorney, Agent, or Firm* — Jianq Chyun IP Office

(57) ABSTRACT

An image processing apparatus and a method thereof are introduced herein. In the method, an image is divided into a plurality of blocks, and a corresponding image processing ratio is set to each of the blocks, wherein each of the blocks includes a plurality of image unit data. Next, the image processing ratios are stored in a filter table, wherein the image unit data of each of the blocks has the corresponding image processing ratio. Next, the filter table is read out and decoded to generate a plurality of filter coefficients, and the corresponding image unit data is obtained according to each of the filter coefficients. Next, filter operation is performed to the corresponding image data and the filter coefficient for outputting a filter operated image data. The image processing ratio can be a zoon ratio or a blur ratio.

18 Claims, 9 Drawing Sheets

IMAGE PROCESSING APPARATUS AND METHOD THAT MAY BLUR A BACKGROUND SUBJECT TO HIGHLIGHT A MAIN SUBJECT

CROSS-REFERENCE TO RELATED APPLICATION

This application claims the priority benefit of Taiwan application serial no. 97119530, filed on May 27, 2008. The entirety of the above-mentioned patent application is hereby incorporated by reference herein and made a part of this specification.

BACKGROUND SUBJECT OF THE INVENTION

1. Field of the Invention

The present invention relates to an image processing apparatus and a method thereof. More particularly, the present invention relates to an image processing system that may blur a background subject to highlight a main subject.

2. Description of Related Art

When a general digital camera captures pictures, a background subject blur technique is utilized to highlight a main subject, so as to avoid losing of focus of a whole image due to excessive clarity of the background subject, in which a camera lens is generally used to achieve such effect. For example, a focus region is located on the main subject, and the background subject is located on the defocus region, so as to naturally blur the background subject and highlight the main subject. Though a former shooting environment usually cannot achieve the aforementioned effect. Sometimes, the background subject is too closed to the main subject to locate it to the defocus region, or depth of field is not short enough, so that the background subject is still located at the focus region. Moreover, when the lens with a different focus range is utilized, the main subject and the background subject may have different space separations, and if the focus range of the lens cannot be changed, zoom in/out space separations of the main subject and the background subject cannot be achieved.

Since the conventional digital camera has various defects and problems, it is one of the major subjects in application of the digital cameras to provide a digital image processing system and a digital image processing method, so as to achieve different space separations of the main subject and the background subject, and perform various image processing according to different settings.

SUMMARY OF THE INVENTION

The present invention is directed to an image processing apparatus and a method thereof, which may blur a background subject to highlight a main subject.

The present invention provides an image processing apparatus including a feeder controller, a data buffer, a decoder and feeder device, a filter coefficient storing buffer, a filter operation unit. The feeder controller is used for controlling accessing of data. The data buffer is used for temporarily store image data accessed by the feeder controller, and the image data is input to the data buffer under control of the feeder controller, wherein the image data includes a plurality of row (column) image unit data. The decoder and feeder device is connected to the feeder controller for receiving a filter table request signal sent from the feeder controller, so as to read and decode a filter table to generate a plurality of filter coefficients and a control signal. The control signal is transmitted to the feeder controller for requesting the feeder controller to control the data buffer to input the corresponding plurality of row (column) image unit data. The filter coefficient storing buffer is used for temporarily storing the filter coefficients output from the decoder and feeder device. The filter operation unit is used for receiving the plurality of row (column) image unit data output from the data buffer and the filter coefficients stored in the filter coefficient storing buffer, and performing filter operation to the plurality of received row (column) image unit data, so as to output filter operated image data.

In an embodiment of the present invention, the image processing apparatus further includes a storing buffer for receiving a part of the filter operated image data, and feeding it back to the filter operation unit for accumulation operation, so as to obtain an integral image data for outputting.

In an embodiment of the present invention, the filter operation unit of the image processing apparatus further includes a plurality of multipliers and an adder. The multipliers are used for receiving the image unit data and the corresponding filter coefficients to perform a multiplication operation, and perform an accumulation operation with data fed back from the storing buffer, so as to obtain the integral image data for outputting.

In an embodiment of the present invention, the image processing apparatus further includes a shift operation unit for confining the filter operated image data within a predetermined range for outputting, under control of the feeder controller.

In an embodiment of the present invention, the image processing apparatus further includes a filter table storage unit connected to the decoder and feeder device for storing the filter table.

In an embodiment of the present invention, the filter table includes a control parameter field and a plurality of filter coefficients, wherein the control parameter field includes a first coefficient and a second coefficient. The first coefficient indicates a number of the filter coefficients required by the presently processed image unit data, and the second coefficient indicates a shifting amount for jumping to a start position of a next image unit data.

The present invention provides an image processing method. First, an image data is read and temporarily stored, wherein the image data includes a plurality of row (column) image unit data. Next, a filter table is read, and is decoded to generate a plurality of filter coefficients, and the corresponding image unit data is obtained according to each of the filter coefficients. Finally, filter operation is performed to the corresponding image unit data and the filter coefficient, so as to output a filter operated image data.

According to the image processing method, when a number of the filter coefficients exceeds a number that can be processed by filter operation, a part of the filter operated image unit data is fed back for accumulating with the other part of the non filter operated image unit data to obtain an integral image data for outputting.

According to the image processing method, a shift operation is further performed to the filter operated image data, so as to confine the filter operated image data within a predetermined range for outputting.

According to the image processing method, the filter table includes a control parameter field and a plurality of filter coefficients, wherein the control parameter field includes a first coefficient and a second coefficient. The first coefficient indicates a number of the filter coefficients required by the presently processed plurality of row (column) image unit data, and the second coefficient indicates a shifting amount for jumping to a start position of next plurality of row (column) image unit data.

The present provides an image processing method. First, an image is divided into a plurality of blocks, and a corresponding image processing ratio is set to each of the blocks, wherein each of the blocks includes a plurality of row (column) image unit data. Next, the image processing ratios are stored in a filter table, wherein the image unit data of each of the regions has the corresponding image processing ratio. Next, the filter table is read out and decoded to generate a plurality of filter coefficients, and the corresponding image unit data is obtained according to each of the filter coefficients. Next, filter operation is performed to the corresponding row (column) image data and the filter coefficients. Deduced by analogy, after the plurality of row (column) image data is processed, a filter operated image data is then output.

According to the image processing method, the image processing ratio is a zoom ratio or a blur ratio.

According to the image processing method, the filter operation performed to the corresponding image unit data and the filter coefficient includes performing a vertical zoom ratio operation and a vertical blur ratio operation to the image, and includes performing a horizontal zoom ratio operation and a horizontal blur ratio operation to the image.

The image processing apparatus and the method thereof provided by the present invention may perform various special image processing according to settings of a user, so as to blur the background subject and highlight the main subject. Accordingly, defects and problems of the conventional technique can be resolved.

In order to make the aforementioned and other objects, features and advantages of the present invention comprehensible, a preferred embodiment accompanied with figures is described in details below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Embodiment of the present invention provides an image processing system and a method thereof, by which a main subject and a background subject of an image may have different space separations, and various special image processing can be performed according to settings of a user.

When a general digital camera captures pictures, a background subject blur technique is utilized to highlight a main subject, so as to avoid losing of focus of a whole image due to excessive clarity of the background subject, in which a camera lens is generally used to achieve such effect. For example, a focus region is located on the main subject, and the background subject is located on the defocus region, so as to naturally blur the background subject and highlight the main subject. Though a former shooting environment usually cannot achieve the aforementioned effect. Sometimes, the background subject is too closed to the main subject to locate it to the defocus region, or depth of field is not short enough, so that the background subject is still located at the focus region. In case that a position of the background subject cannot be changed, a digital processing method is applied to blur the background subject and highlight the main subject.

Moreover, the lens with a different focus range is utilized, the main subject and the background subject may have different space separations, and if the focus range of the lens cannot be changed, zoom in or zoom out of the main subject and the background subject can still be achieved via the digital image processing.

To achieve the aforementioned effect, the image has to be divided in to a plurality of blocks, and whether each of the blocks is belonged to the main subject, the background subject or a transitional region of the main subject and the background subject is marked, so as to perform different image processing to different marked blocks. Therefore, a structure for implementing such demand is required.

Figures 1A, 1B:
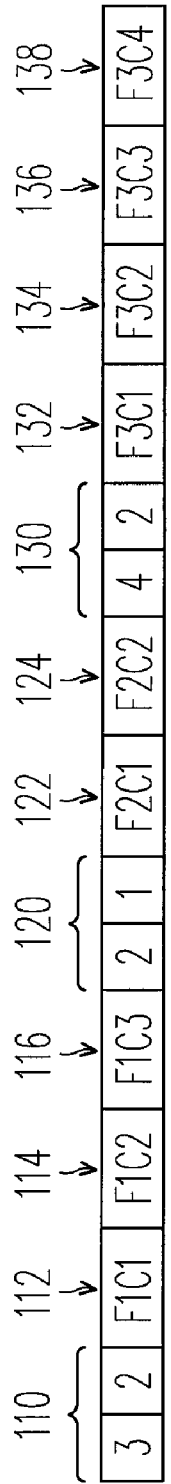
FIG. 1A is diagram illustrating a universal filter table defined according to an embodiment of the present invention.
FIG. 1B is a diagram illustrating seven line image sources.

To support various types of the filter, a universal filter table is defined in the present embodiment, which is as that shown in FIG. 1A. The universal filter table is used for obtaining a corresponding line image source, and seven line image sources shown in FIG. 1B are taken as an example.

In the filter table of FIG. 1A, data of one byte represents a control parameter, and corresponding filter operation coefficients are attached behind. In the control parameter, the first four bits (most significant bit (MSB)) represent how many filter operation coefficients are required by the line image data for such filter operation, and the last four bits (least significant bit (LSB)) represent that after a first operation and output of the line image data, and at the beginning of a next operation and output, how many lines are jumped for a start position of the line image data.

For example, referring to FIG. 1A and FIG. 1B, there are numerals "3" and "2" in a first byte 110, and filter operation coefficients "F1C1", "F1C2" and "F1C3" with reference numerals of 112, 114 and 116 are attached behind, which represents that there are 3 line image data to be processed from a start line image, and 3 coefficients 112, 114 and 116 serve as filter operation coefficients of the line image data. After the filter operation is completed, at the beginning of the next operation and output, 2 lines are jumped for reading data.

For example, a presently processed line image data is a first line image data 141, and the corresponding control parameters and the filter operation coefficients are "3", "2", "F1C1", "F1C2" and "F1C3", and data of a first line image data 141

(Line1), a second line image data 142 (Line2) and a third line image data 143 (Line3) are obtained. After the filter operation, an output thereof is:

Line Output1=(Line1*$F1C1$+Line2*$F1C2$+
Line3*$F1C2$).

Since 2 lines are jumped for a next data to be read, the next output is started from the third line image data 143, and the corresponding parameters and filter operation coefficients are "2", "1", "F2C1" and "F2C2", and data of the third line image data 143 (Line3) and a fourth line image data 144 (Line4) are obtained. After the filter operation, the output thereof is:

Line Output2=(Line3*$F2C1$+Line4*$F2C2$).

Since 1 line is jumped for a next data to be read, the next output is started from the fourth line image data 143, and the corresponding parameters and filter operation coefficients are "4", "2", "F3C1", "F3C2", "F3C3" and "F2C4", and data of the fourth line image data 144 (Line4), a fifth line image data 145 (Line5), a sixth line image data 146 (Line6) and a seventh line image data 147 (Line7) are obtained. After the filter operation, the output thereof is:

Line Output3=(Line4*$F3C1$+Line5*$F3C2$+
Line6*$F3C3$+Line7*$F3C4$).

In the aforementioned control parameters, the first four bits and the last four bits are used for controlling, though the present invention is not limited to such number of bits. Moreover, the adopted filter operation is performed in allusion to the line image sources, though it can also be performed in allusion to an image data with a predetermined magnitude, the reason of utilizing the line image sources is to coordinate with existing line buffers. The aforementioned content can be adjusted according to actual design requirements or the number of coefficients required by the filter operation. In the following content, an embodiment is provided for describing an image processing apparatus of the present invention.

Figure 2:
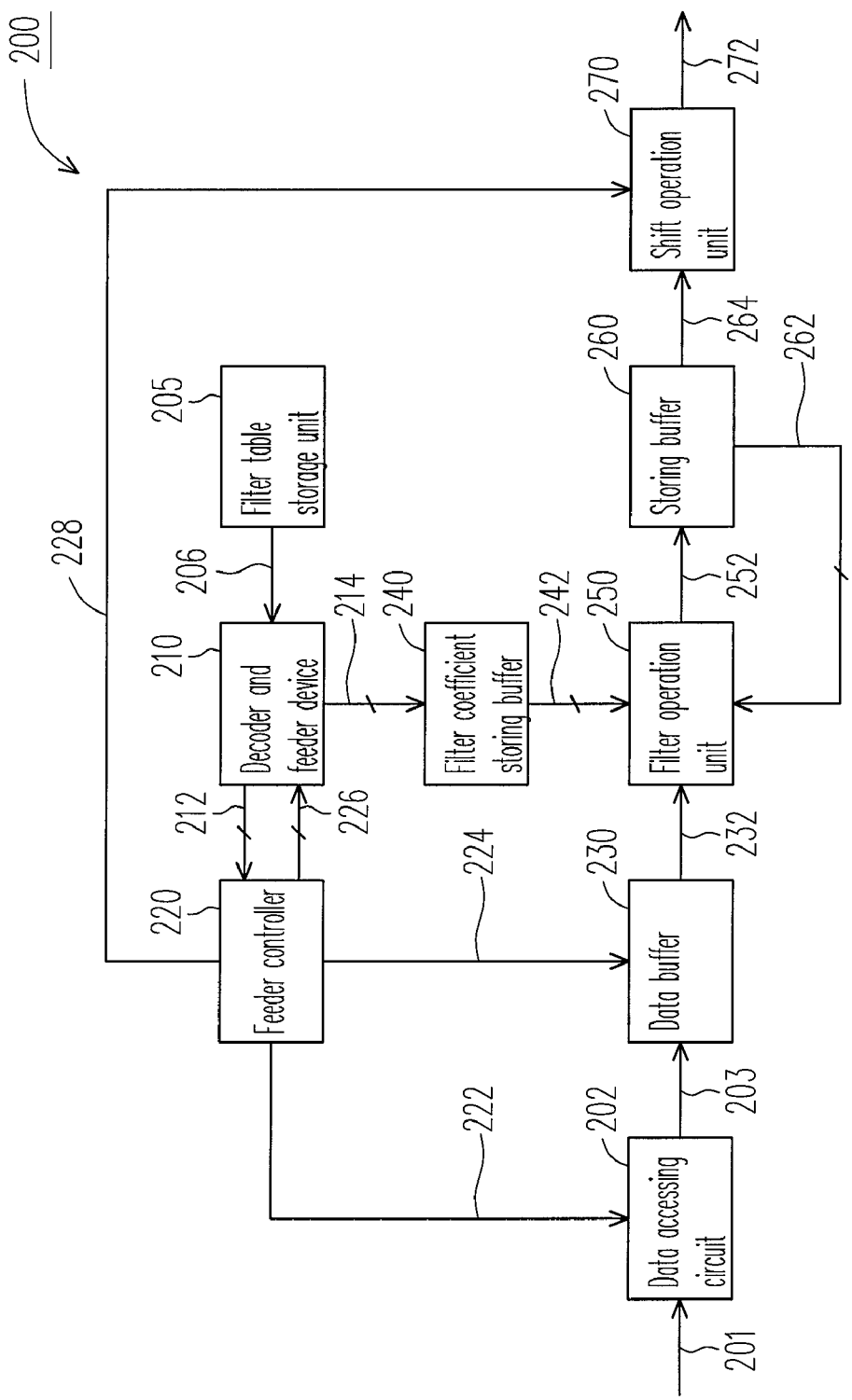
FIG. 2 is a schematic diagram illustrating an image processing apparatus according to an embodiment of the present invention.

Referring to FIG. 2, an image processing apparatus 200 of the present embodiment includes a decoder and feeder device 210, a feeder controller 220, a data buffer 230, a filter coefficient storing buffer 240, a filter operation unit 250, a storing buffer 260 and a shift operation unit 270.

First, a data accessing circuit 202 reads a strip-shape image data 201, wherein the data accessing circuit 202 is for example, a direct memory access (DMA) circuit, the DMA circuit is a hardware structure which allows the image processing apparatus 200 to directly access a memory thereof, and participation of a CPU is unnecessary. The data accessing circuit 202 is directly controlled by the feeder controller 220 via a control signal 222 shown in FIG. 2, so as to read data. Next, the read data is temporarily stored in the data buffer 230, wherein the data buffer 230 is for example, a buffer device composed of a plurality of line buffers, and is controlled by a signal 224 output from the feeder controller 220, so as to output the data to the filter operation unit 250 for filter operation. Meanwhile, the feeder controller 220 outputs a signal 226 to the decoder and feeder device 210 for reading the filter table provided by the present embodiment.

A filter table storage unit 205 is used for storing the filter table corresponding to the strip-shape image data 201. A format of the filter table is as that shown in FIG. 1A, which includes the control parameters and the filter coefficients required for processing the strip-shape image data 201. The filter table is a universal filter table which may support various types of the filter.

The decoder and feeder device 210 decodes an internal information of the filter table storage unit 205, and performs a corresponding processing according to the decoded content. For example, if the line image source is about to be processed, the required filter operation coefficients are transmitted to the filter coefficient storing buffer 240 in response to a multi-bit signal 214 for temporary storage, and are transmitted to the feeder controller 220 in response to a multi-bit signal 212, so as to notify the feeder controller 220 how many lines of input image are required for a current processing, and which line image is the line image source shifted to, after the current processing and output is completed, and at the beginning of a next processing.

The image processing apparatus 200 may temporarily store data of intermediate processing process into the storing buffer 260, and if the number of line images to be filter operated exceeds a number that can be once processed by the feeder controller 220, namely, if the number of the filter operation coefficients exceeds the number that can be once processed by the feeder controller 220, separate processing is required to implement an integral filter operation. Now, the data of intermediate processing process stored in the storing buffer 260 can be fed back to the filter operation unit 250 in response to a multi-bit signal 262 for an accumulation operation, so as to output an integral image signal, shown as an image signal 264 of FIG. 2.

The shift operation unit 270 selectively performs the shift operation to the output image signal 264 to confine the output image signal 264 within a certain range, and outputs an adjusted image signal 272. Such shift operation is selective, which can be omitted to directly output the image signal 264. Whether the shift operation unit 270 performs the shift operation is controlled by the feeder controller 220 via a signal 228, and the signal 228 is used for indicating whether the integral output image is completed, and driving the shift operation unit 270 only when the integral output image is completed.

During the aforementioned separate processing, the decoder and feeder device 210 is required to be operated correspondingly. For example, the decoder and feeder device 210 separately transmits the filter operation coefficients to the filter coefficient storing buffer 240. The data accessing circuit 202 is also required to be operated correspondingly for capturing different number of line image data of the input image at an appointed position according to an actual demand. Here, the data accessing circuit 202 captures different number of the line image data of the input image at the appointed position according to the actual demand of the feeder controller 220.

According to the aforementioned circuit structure of the image processing system and the method thereof provided by the present invention, the main subject and the background subject may have different space separations, and various special image processing can be performed according to different settings of the user. In the following content, an embodiment is provided to describe a vertical filter processing circuit and a horizontal filter processing circuit in detail with reference of FIG. 3 and FIG. 4.

Figure 3:
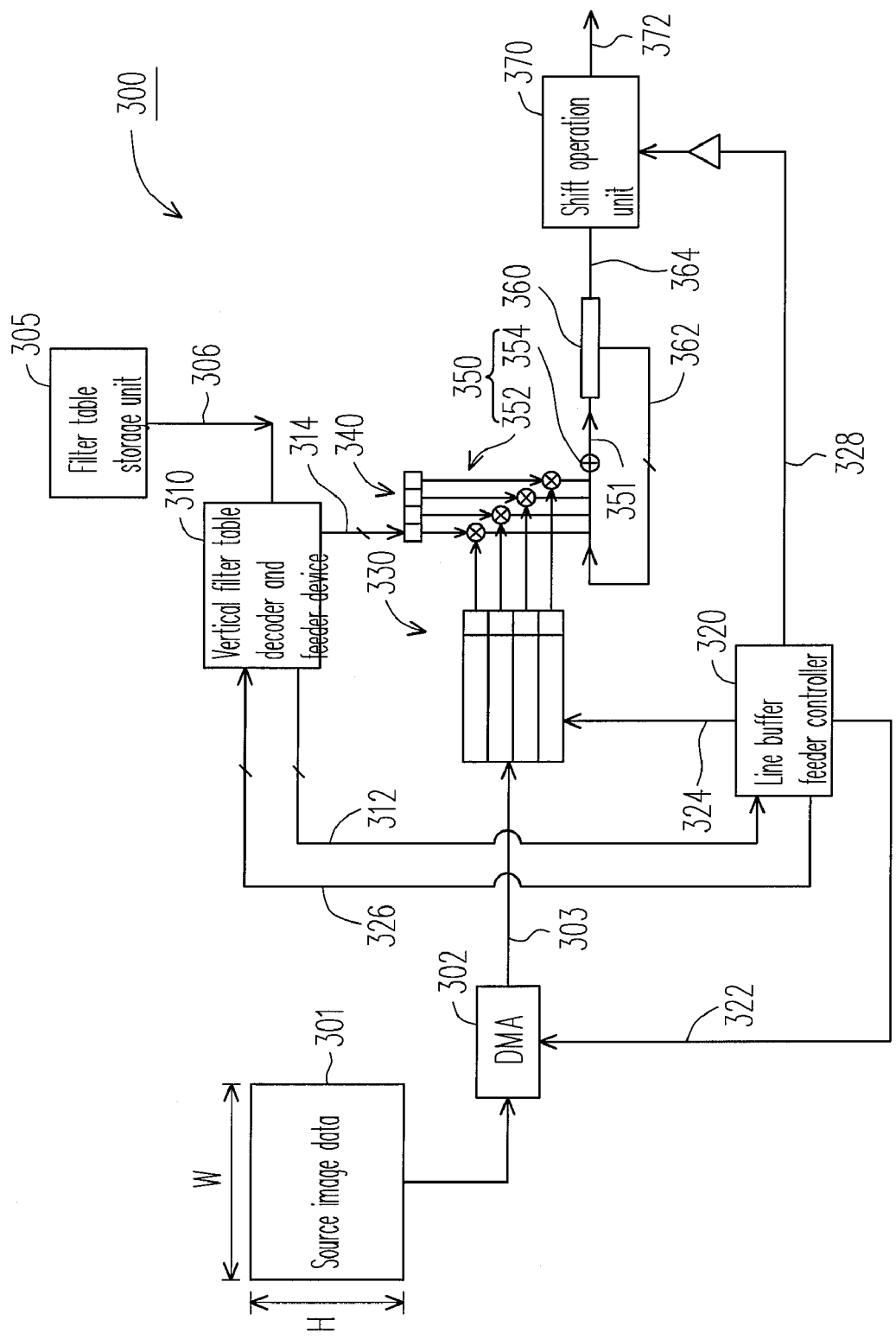
FIG. 3 is a structural diagram of a vertical filter processing device according to an embodiment of the present invention.

Referring to FIG. 3, a vertical filter processing device 300 includes a vertical filter table decoder and feeder device 310, a line buffer feeder controller 320, a line data buffer 330, a filter coefficient storing buffer 340, a filter operation unit 350, a storing buffer 360 and a shift operation unit 370.

First, an output signal 326 of the line buffer feeder controller 320 is transmitted to the vertical filter table decoder and feeder device 310 for reading the filter table of the present embodiment.

A filter table storage unit 305 is used for storing the filter table corresponding to a source image data 301. A format of the filter table is as that shown in FIG. 1A, which includes the control parameters and the filter coefficients required for processing the source image data 301. The filter table is a universal filter table which may support various types of the filter.

The vertical filter table decoder and feeder device 310 decodes an internal information of the filter table storage unit 305, and performs a corresponding processing according to the decoded content. For example, if the source image data 301 is about to be processed, the required operation coefficients are transmitted to the filter coefficient storing buffer 340 in response to a multi-bit signal 314 for temporary storage, and are transmitted to the line buffer feeder controller 320 in response to a multi-bit signal 312, so as to notify the line buffer feeder controller 320 how many lines of input image are about to be processed. A DMA circuit 302 accesses the strip-shape source image data 301 with a width of W and a height of H. The DMA circuit 302 receives a control signal 322 from the line buffer feeder controller 320, and performs data reading in response to the control signal 322. Next, the read data is temporarily stored in the line data buffer 330. The line data buffer 330 is for example, a buffer device composed of four line buffers, which may transmit the data to the filter operation unit 350 in response to a signal 324 output from the line buffer feeder controller 320, so as to perform the filter operation. After such line image is processed and output, the start position of the line image source is shifted to a certain line image for processing a next image data.

The vertical filter processing device 300 may temporarily store data of intermediate processing process into the storing buffer 360, and if the number of line images to be filter operated exceeds four, i.e. the number of the filter operation coefficients exceeds a number that can be once processed by the filter operation unit 350, separate processing is required to implement an integral filter operation. Now, the data of intermediate processing process stored in the storing buffer 360 can be fed back to the filter operation unit 350 in response to a multi-bit signal 362 for an accumulation operation, so as to output an integral image signal, shown as an image signal 364 of FIG. 3.

The filter operation unit 350 includes for example, four multipliers 352 and an adder 354. Each of the multipliers 352 corresponds to a line buffer unit within the line data buffer 330. The four line buffer units are disposed in parallel to transmit the line image data to the four multipliers 352 for performing a multiplication operation with the filter operation coefficients stored in the filter coefficient storing buffer 340, and after an addition operation performed by the adder 354, a result thereof is transmitted to the storing buffer 360.

The shift operation unit 370 selectively performs the shift operation to the output image signal 364 to confine the output image signal 364 within a certain range, and outputs an adjusted image signal 372. Such shift operation is selective, which can be omitted to directly output the image signal 364. Whether the shift operation unit 370 performs the shift operation is controlled by the line buffer feeder controller 320 via a signal 328, and the signal 328 is used for indicating whether the integral output image is completed, and driving the shift operation unit 370 only when the integral output image is completed.

Figure 4:
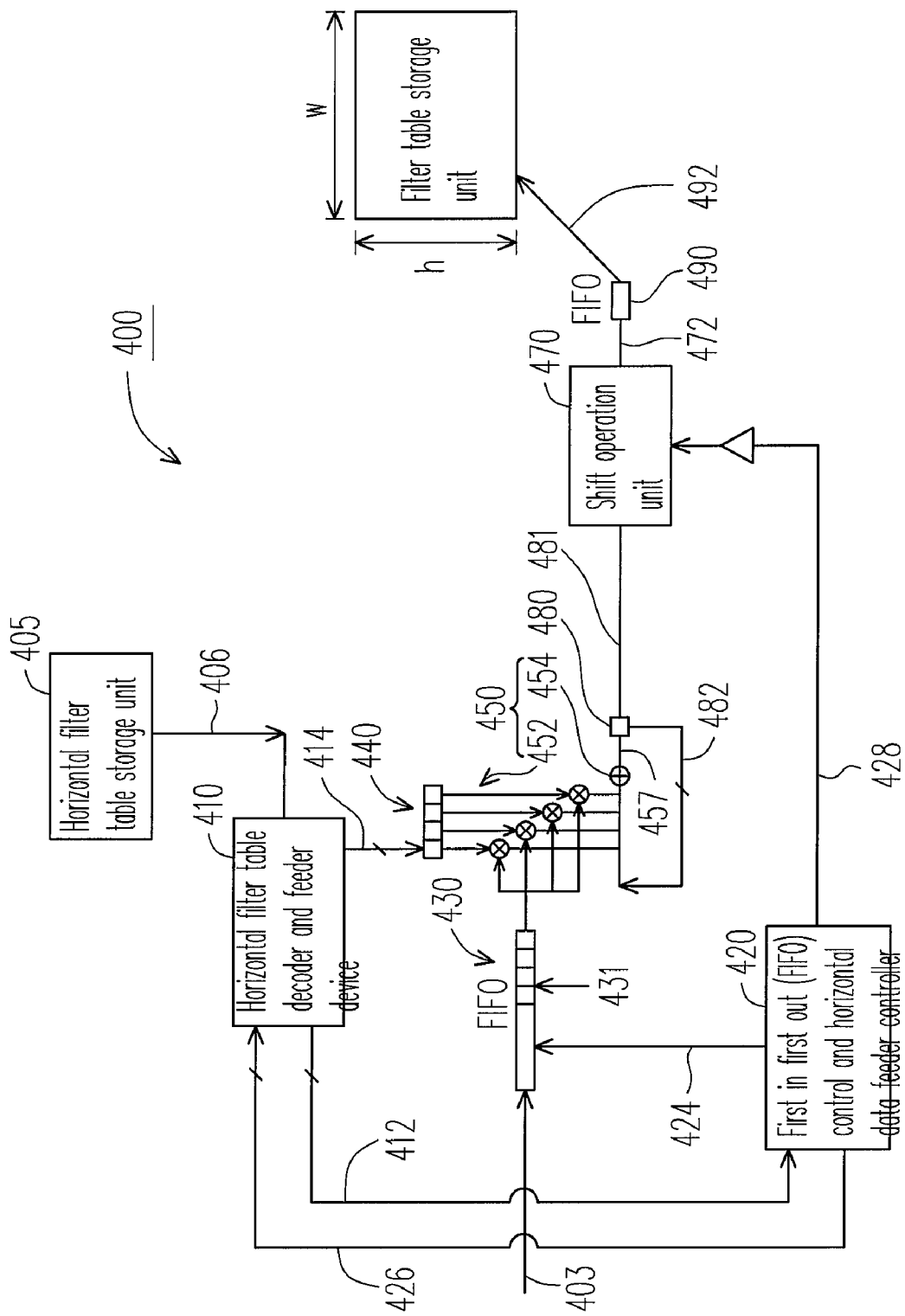
FIG. 4 is a structural diagram of a horizontal filter processing device according to an embodiment of the present invention.

Referring to FIG. 4, a horizontal filter processing device 400 includes a horizontal filter table decoder and feeder device 410, a first in first out (FIFO) control and horizontal data feeder controller 420, a FIFO buffer 430, a filter coefficient storing buffer 440, a filter operation unit 450, a pixel buffer 480 and a shift operation unit 470.

The horizontal filter processing device 400 receives a source image data 403. The source image data 403 can be for example, a vertical adjusted signal output from the vertical filter processing device 300. The source image data 403 is directly transmitted to the FIFO buffer 430. The FIFO buffer 430 has a position indicator 431 indicating an initial position of a current processed source image, and when the processing is completed, the position indicator 431 is shifted to a certain pixel for a next processing. According to the number of pixels that can be once processed by the filter operation unit 450, the FIFO buffer 430 once outputs data corresponding such number of the pixels to perform the filter operation. Data transmission of the FIFO buffer 430 is controlled by the FIFO control and horizontal data feeder controller 420. Meanwhile, a signal 426 output from the FIFO control and horizontal data feeder controller 420 is also transmitted to the horizontal filter table decoder and feeder device 410 for reading the filter table of the present embodiment.

A filter table storage unit 405 is used for storing the filter table. A format of the filter table is as that shown in FIG. 1A, which includes the control parameters and the filter coefficients required for processing the source image data 403. The filter table is a universal filter table which may support various types of the filter.

The horizontal filter table decoder and feeder device 410 decodes an internal information of the filter table storage unit 405, and performs a corresponding processing according to the decoded content. For example, if the source image data 403 is about to be processed, the required filter operation coefficients are transmitted to the filter coefficient storing buffer 440 in response to a multi-bit signal 414 for temporary storage, and are transmitted to the FIFO control and horizontal data feeder controller 420 in response to a multi-bit signal 412, so as to notify the FIFO control and horizontal data feeder controller 420 how many pixels of the image are about to be processed, and which pixel is the position indicator 431 shifted to, after image data of these pixels is processed and output, so as to perform a next processing.

The horizontal filter processing device 400 may temporarily store data obtained during the processing into the pixel buffer 480, and if the number of the pixels to be filter operated exceeds four, i.e. the number of the filter operation coefficients exceeds a number that can be once processed by the filter operation unit 450, separate processing is required to implement an integral filter operation. Now, the data stored in the storing buffer 360 can be fed back to the filter operation unit 450 in response to a multi-bit signal 482 for an accumulation operation, so as to output an integral image signal, shown as an image signal 481 of FIG. 4.

The filter operation unit 450 includes for example, four multipliers 452 and an adder 454. Each of the multipliers 452 corresponds to a pixel data within the FIFO buffer 430, so as to perform a multiplication operation with the filter operation coefficients stored in the filter coefficient storing buffer 440, and after an addition operation performed by the adder 454, a result thereof is transmitted to the pixel buffer 480.

The shift operation unit 470 selectively performs the shift operation to the output image signal 481 to confine the output image signal 481 within a certain range, and outputs an adjusted image signal 472 to a FIFO buffer 490 for temporary storage. Then, the FIFO buffer 490 outputs a target image with a height of h and a length of w via a signal 492. Such shift operation is selective, which can be omitted to directly output the image signal 481. Whether the shift operation unit 470 performs the shift operation is controlled by the FIFO control and horizontal data feeder controller 420 via a signal 428, and the signal 428 is used for indicating whether the integral output image is completed, and driving the shift operation unit 470 only when the integral output image is completed.

Figure 5A:
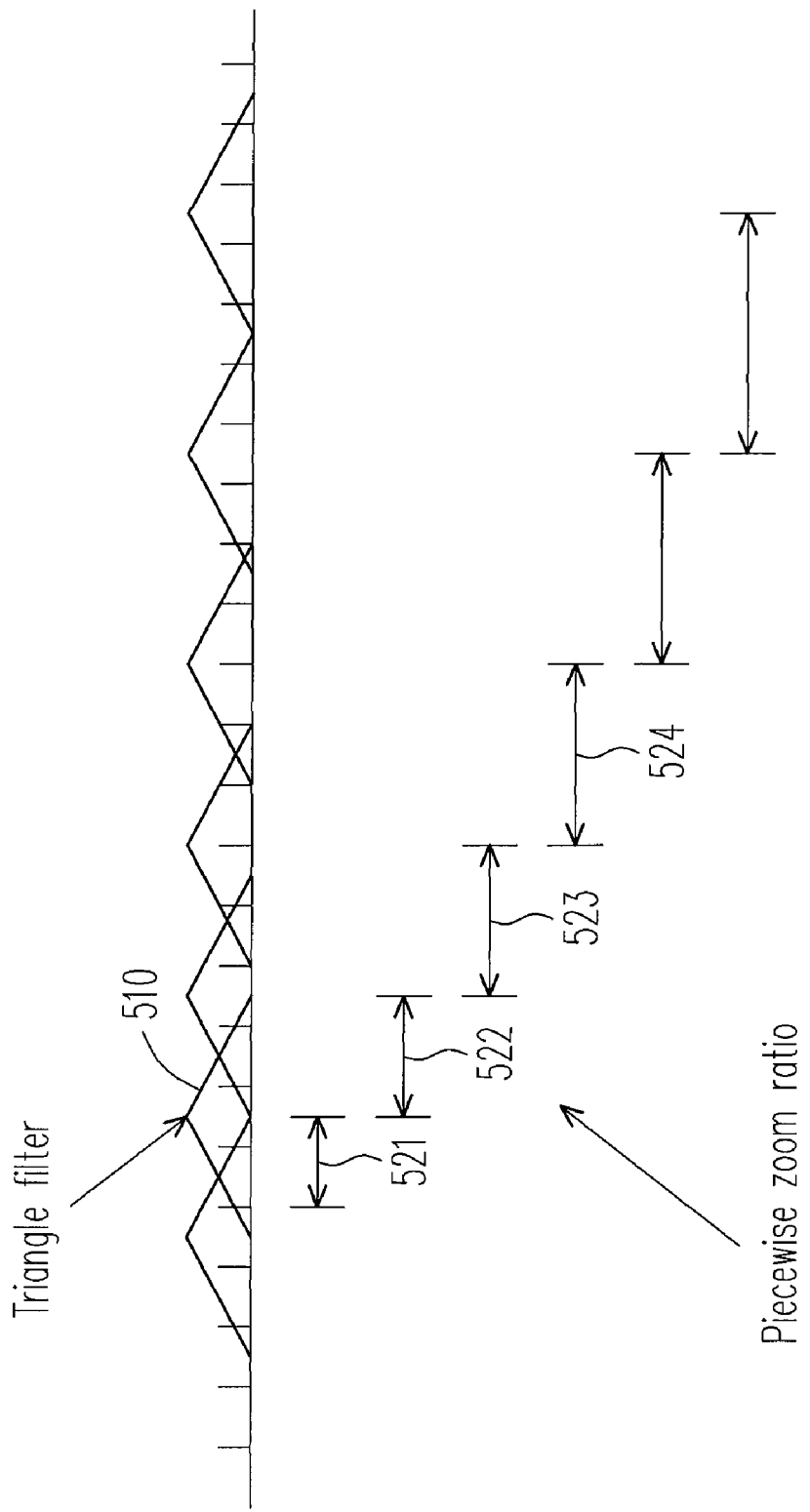
FIG. 5A is a schematic diagram illustrating a method of filter processing based on piecewise zoom ratios according to an embodiment of the present invention.

FIG. 5A is a schematic diagram illustrating a method of filter processing based on piecewise zoom ratios according to an embodiment of the present invention. Assuming a triangle filter 510 is used for processing zoom in/zoom out of the image, and a length of the triangle filter 510 is 4, a next equation is then obtained.

$$b0=(a0*F(0)+a1*F(1)+a2*F(2)+a3*F(3))/(F(1)+F(2)+F(3)+F(4))$$

wherein, a0 represents a pixel value of a 0-th input image within the triangle filter 510, and a corresponding filter coefficient value F(0) thereof is obtained according to a triangle formula. Similarly, a1, a2 and a3 respectively represent pixel values of a first, a second and a third input images within the triangle filter, and F(1), F(2) and F(3) represent the corresponding filter coefficients. If the aforementioned values are input to the above equation, a value of b0 is then obtained, which represents a 0-th pixel value of an output image, and results thereof are shown as 521, 522, 523 and 524 of FIG. 5A.

Assuming the piecewise zoom ratios are utilized to apply different zoom ratios to different sections of the input image, for example, the zoom ratio of a second pixel of the output image is 1.5, the triangle filter is then shifted for 1.5 pixel values, and a value of b1 is obtained based on the second pixel of the output image. Similarly, values of the third pixel, the fourth pixel and the fifth pixel of the output image respectively represent that the zoom ratios thereof are 2, 2.5, 3 and 3.5.

According to the above deduction, the results thereof may form the filter table required by the vertical filter, or form the filter table required by the horizontal filter. The filter table records the number of pixel values of the input image, the corresponding filter coefficients, and the number of pixels jumped by the input image when a next pixel is required to be processed.

Figure 5B:
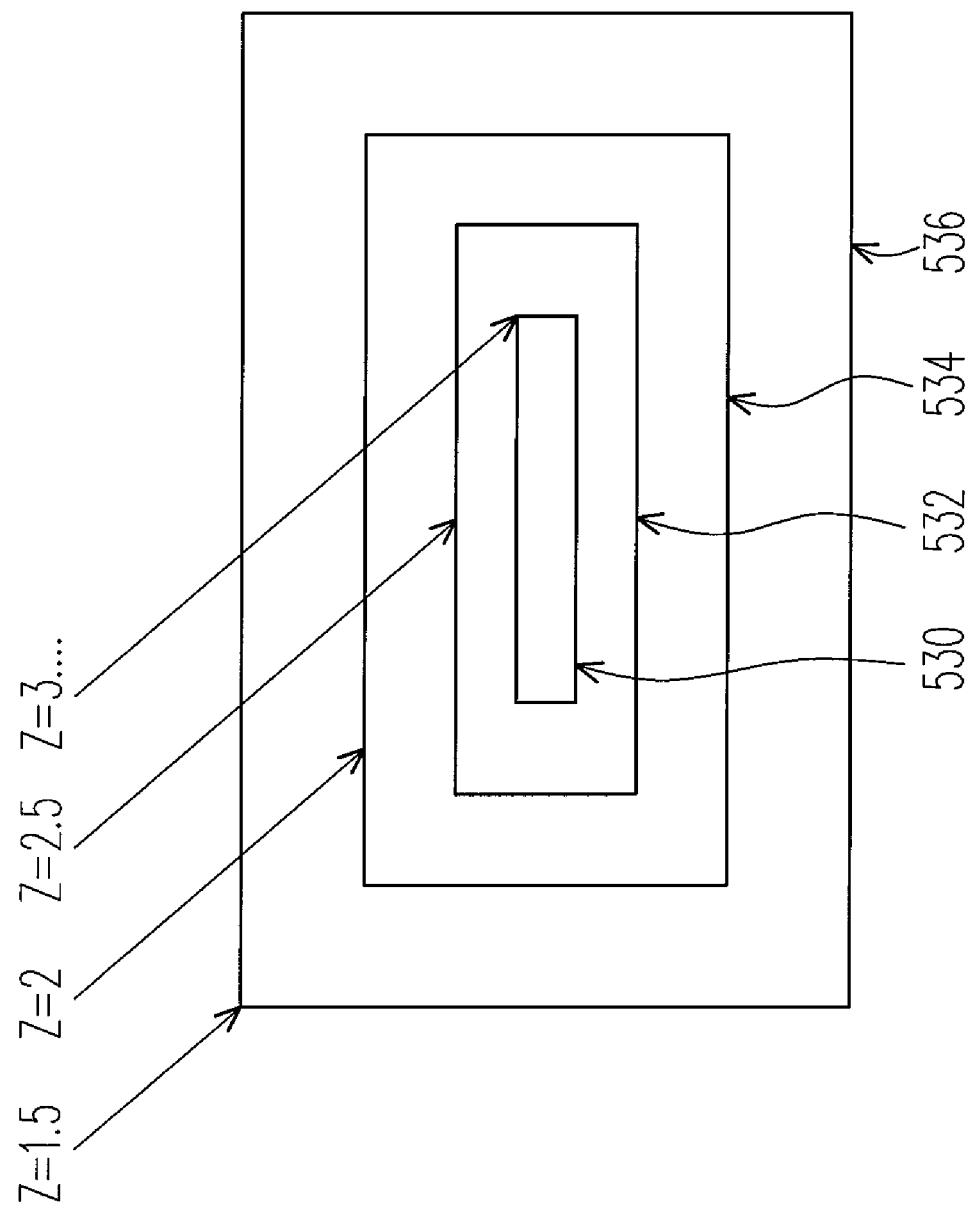
FIG. 5B is a schematic diagram illustrating a method of processing positions of an image via different zoom ratios according to an embodiment of the present invention.

FIG. 5B is a schematic diagram illustrating a method of processing positions of an image via different zoom ratios according to an embodiment of the present invention. According to the aforementioned method, the image can be divided into different regions, and different zoom ratios can be applied thereon. For example, regions 530, 532, 534 and 536 respectively have different zoom ratios 3, 2.5, 2 and 1.5. Assuming the background of the image is located at four corners of the image, and the foreground of the image is located at the center of the image, and meanwhile a relatively small magnification is applied to the background, and a relatively great magnification is applied to the center. Then, the foreground has a relatively great magnification compared to that of the background, so that the main subject can be highlighted, or a visual effect that a distance between the main subject and the background subject is elongated can be achieved.

Figure 6A:
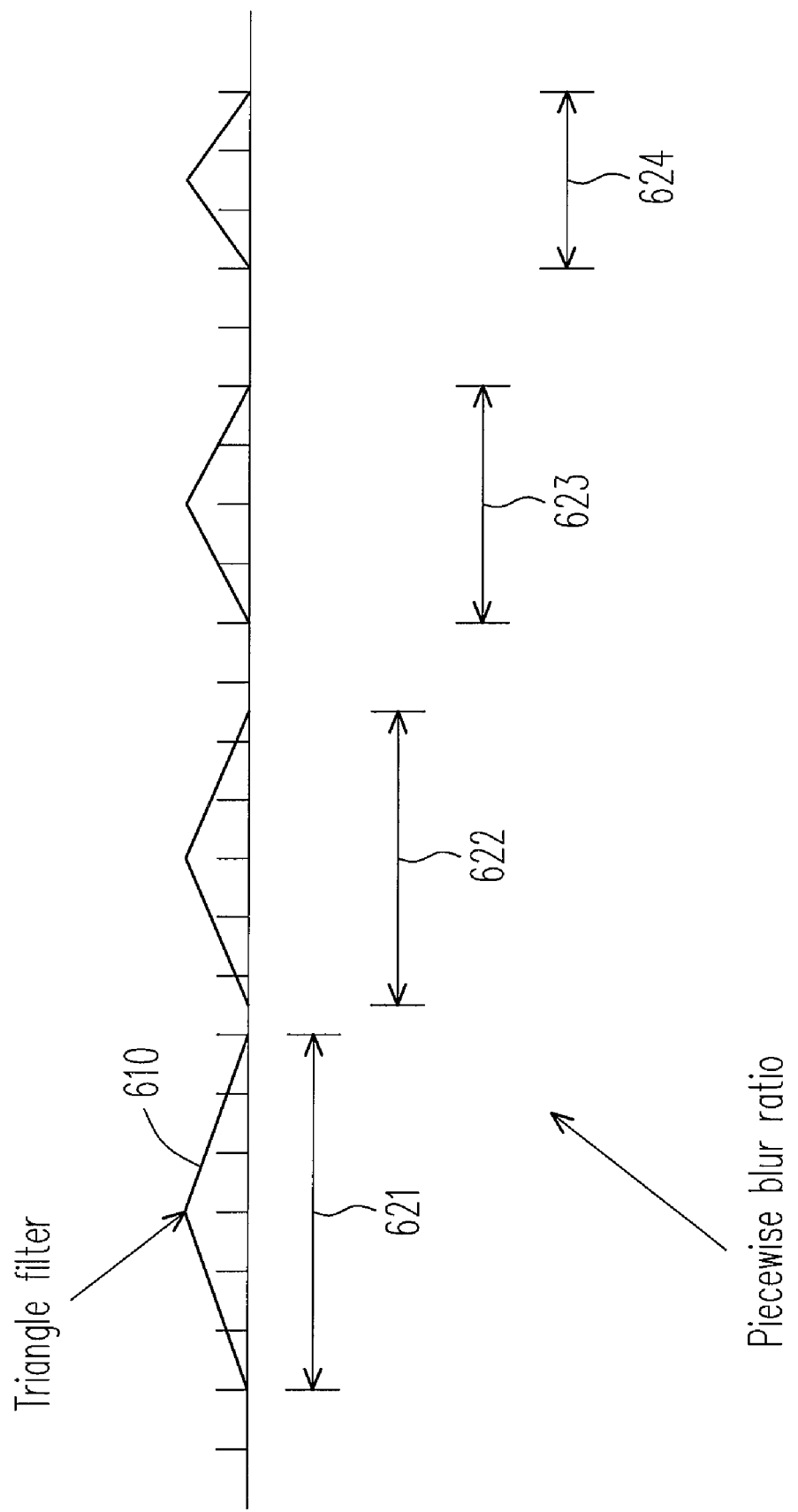
FIG. 6A is a schematic diagram illustrating a method for filter processing based on piecewise blur ratios according to an embodiment of the present invention.

FIG. 6A is a schematic diagram illustrating a method for filter processing based on piecewise blur ratios according to an embodiment of the present invention. First, a blur ratio is defined, and the greater the blur ratio is, the more obvious a blur effect is. During the digital image processing, the wider a low pass filter is, the more high frequency components of the input image are filtered, and the more blurry the image is. Assuming the triangle filter is applied, and in a first case, a filter width of 6 is applied for image process, a blur effect of blur ratio=3 is then obtained. Similarly, different filter widths of 5, 4 and 3 are piecewise applied, and the image with different blur ratios 2.5, 2 and 1.5 is obtained, so that piecewise consecutive blur effects are achieved.

According to the above deduction, the results thereof may form the filter table required by the vertical filter, or form the filter table required by the horizontal filter. The filter table records the number of pixel values of the input image, the corresponding filter coefficients, and the number of pixels jumped by the input image when a next pixel is required to be processed.

Figure 6B:
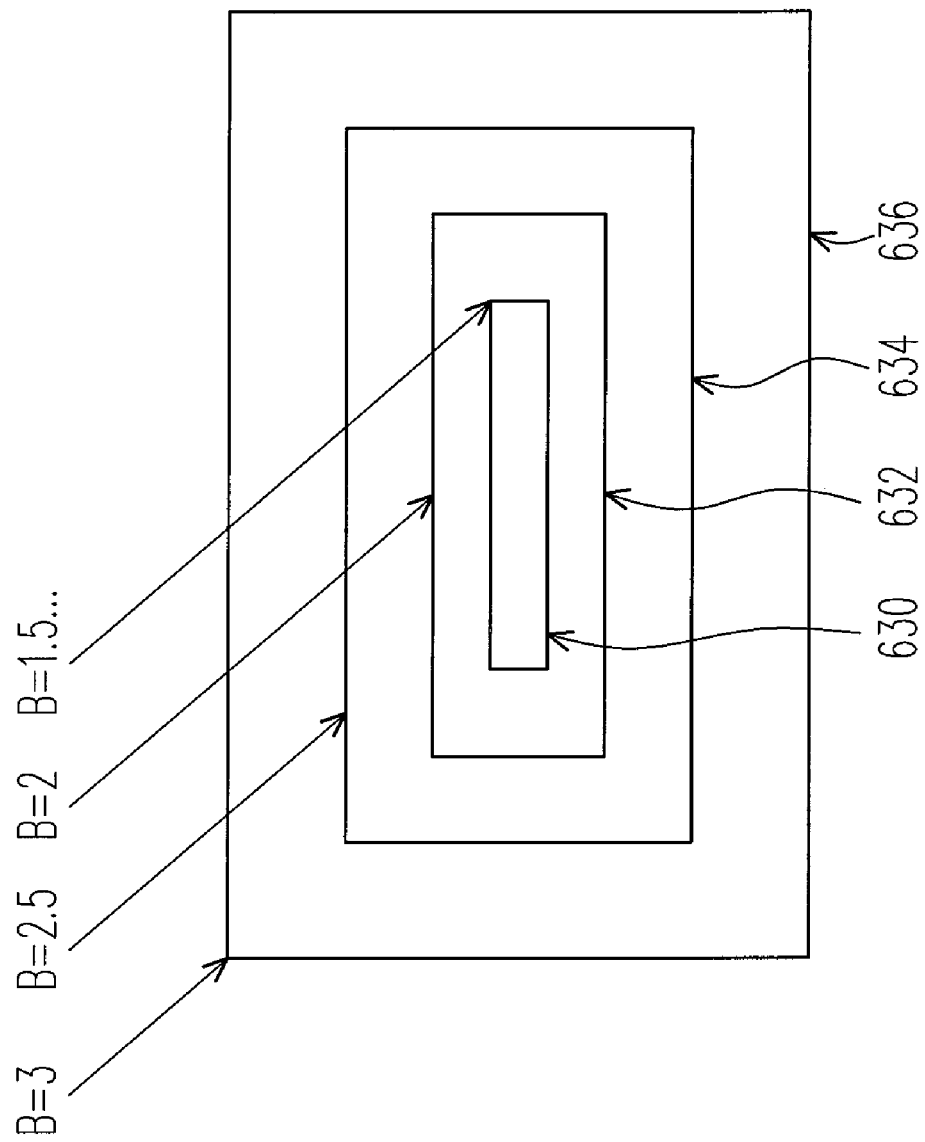
FIG. 6B is a schematic diagram illustrating a method of processing positions of an image via different zoom ratios according to an embodiment of the present invention.

FIG. 6B is a schematic diagram illustrating a method of processing positions of an image via different zoom ratios according to an embodiment of the present invention. According to the aforementioned method, the image can be divided into different regions, and different blur ratios can be applied thereon. For example, regions 630, 632, 634 and 636 respectively have different blur ratios 1.5, 2, 2.5 and 3. Assuming the background of the image is located at four corners of the image, and the foreground of the image is located at the center of the image, and meanwhile relatively great blur ratio is applied to the background, and relatively small blur ratio is applied to the center. Then, the foreground is more clear compared to the background, so that the main subject can be highlighted, or a visual effect of blurring the background is achieved.

Figure 7:
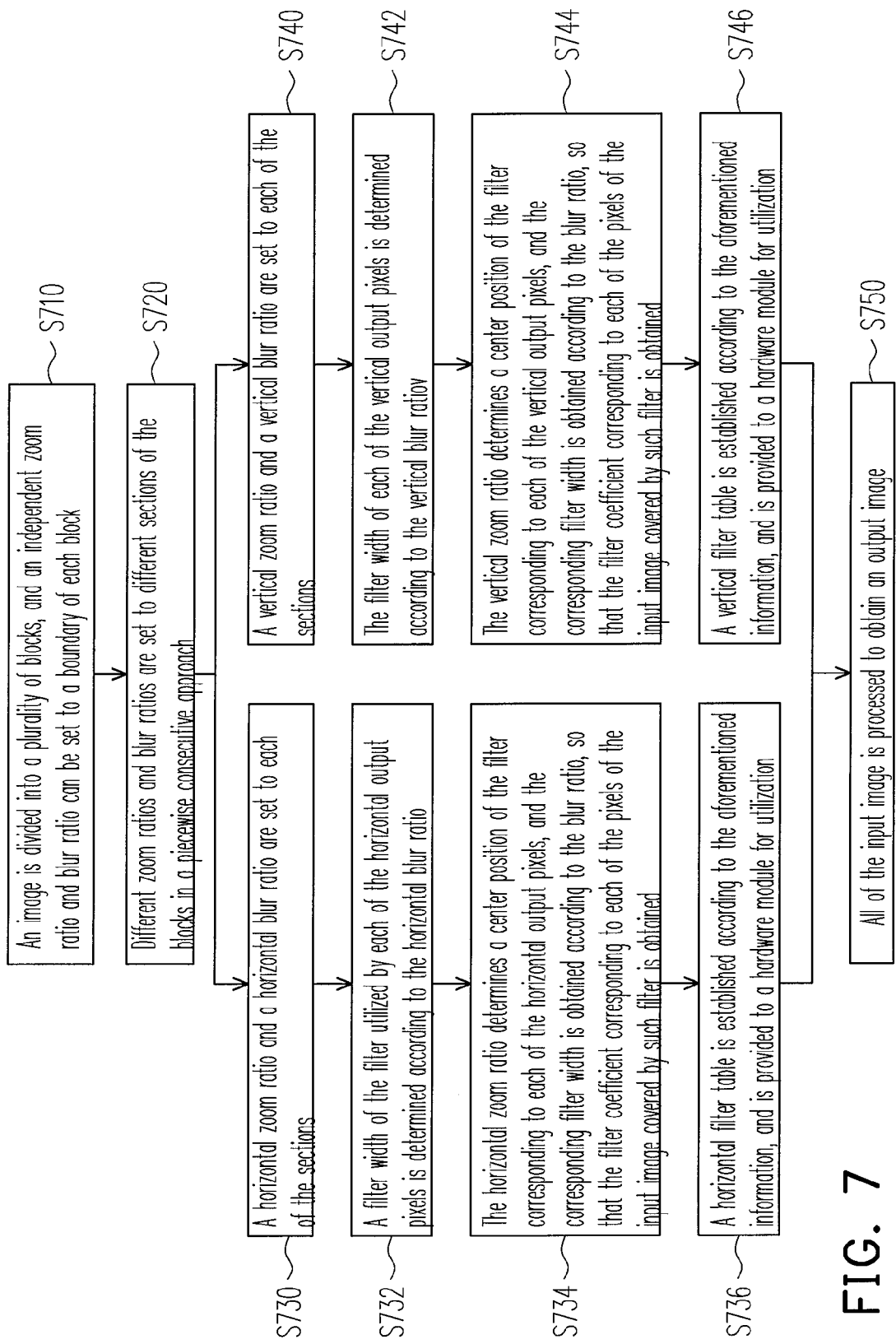
FIG. 7 is a flowchart illustrating an image processing method according to an embodiment of the present invention.

FIG. 7 is a flowchart illustrating an image processing method according to an embodiment of the present invention. The image processing method can be described as follows. First, in step S710, an image is divided into a plurality of blocks, and an independent zoom ratio and blur ratio can be set to a boundary of each block. Next, in step S720, different zoom ratios and blur ratios are set to different sections of the blocks in a piecewise consecutive approach, so as to reduce a block effect. Next, steps S730 to S736, and steps S740 to S746 are respectively executed.

For the horizontal filter processing, first, in step S730, a horizontal zoom ratio and a horizontal blur ratio are set to each of the sections. In step S732, a filter width of the filter utilized by each of the horizontal output pixels is determined according to the horizontal blur ratio. In step S734, the horizontal zoom ratio determines a center position of the filter corresponding to each of the horizontal output pixels, and the corresponding filter width is obtained according to the blur ratio, so that the filter coefficient corresponding to each of the pixels of the input image covered by such filter is obtained. In step S736, a horizontal filter table is established according to the aforementioned information, and is provided to a horizontal filter processing circuit for utilization.

For the vertical filter processing, in step S740, a vertical zoom ratio and a vertical blur ratio are set to each of the sections. In step S742, the filter width of each of the vertical output pixels is determined according to the vertical blur ratio. In step S744, the vertical zoom ratio determines a center position of the filter corresponding to each of the vertical output pixels, and the corresponding filter width is obtained according to the blur ratio, so that the filter coefficient corresponding to each of the pixels of the input image covered by such filter is obtained. In step S746, a vertical filter table is established according to the aforementioned information, and is provided to a vertical filter processing circuit for utilization.

Finally, in step S750, all of the input image is processed to obtain an output image.

The present invention further provides a vertical filter processing circuit and a horizontal filter processing circuit, and the vertical filter processing circuit and the horizontal filter processing circuit can perform various special image processing according to settings of a user.

The image processing system, the vertical filter processing circuit and the horizontal filter processing circuit provided by the present invention can be applied to an embedded system.

The image processing apparatus and the method thereof provided by the present invention may perform various special image processing according to the settings of the user, so as to blur the background subject and highlight the main subject. Accordingly, defects and problems of the conventional technique can be resolved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An image processing apparatus, comprising:
   a feeder controller, for controlling accessing of data;
   a data buffer, for temporarily storing an image data accessed by the feeder controller, wherein the feeder controller controls outputting of the image data, and the image data comprises a plurality of image unit data;
   a decoder and feeder device, connected to the feeder controller, for receiving a filter table request signal sent from the feeder controller, so as to read and decode a filter table to generate a plurality of filter coefficients and a control signal, wherein the control signal is transmitted to the feeder controller for requesting the feeder controller to control the data buffer to output the corresponding plurality of image unit data;
   a filter coefficient storing buffer, for temporarily storing the filter coefficients output from the decoder and feeder device; and
   a filter operation unit, for receiving the image unit data output from the data buffer and the filter coefficients stored in the filter coefficient storing buffer, and performing filter operation to the received image unit data, so as to output the filter operated image data.

2. The image processing apparatus as claimed in claim 1 further comprising a storing buffer for receiving a part of image data after filter operation, and feeding the received image data back to the filter operation unit for accumulation operation, so as to obtain an integral image data for outputting.

3. The image processing apparatus as claimed in claim 2 further comprising a shift operation unit for confining the image data after filter operation within a predetermined range to output under control of the feeder controller.

4. The image processing apparatus as claimed in claim 1, wherein the filter operation unit at least comprises a plurality of multipliers and an adder, the multipliers are used for receiving the image unit data and the corresponding filter coefficients to perform a multiplication operation, and perform an accumulation operation with data fed back from the storing buffer, so as to obtain the integral image data for outputting.

5. The image processing apparatus as claimed in claim 1 further comprising a data accessing circuit connected to the feeder controller and an external image source, wherein the feeder controller controls the data accessing circuit to access the external image source, and stores the obtained image data in the data buffer.

6. The image processing apparatus as claimed in claim 1 further comprising a filter table storage unit connected to the decoder and feeder device for storing the filter table.

7. The image processing apparatus as claimed in claim 1, wherein the filter table includes a control parameter field and the filter coefficients, wherein the control parameter field includes a first coefficient and a second coefficient, the first coefficient indicates number of the filter coefficients required by the presently processed image unit data, and the second coefficient indicates a shifting amount for jumping to a start position of a next image unit data.

8. The image processing apparatus as claimed in claim 1, wherein the filter operation unit at least comprises a plurality of multipliers for receiving the image unit data and the corresponding filter coefficients to perform a multiplication operation for outputting.

9. The image processing apparatus as claimed in claim 1, wherein the image unit data is a line image data, and the image data is composed of the line image data.

10. The image processing apparatus as claimed in claim 9, wherein the data buffer is composed of a plurality of line buffers, and each of the line buffers is used for temporarily storing the line image data.

11. The image processing apparatus as claimed in claim 10, wherein the filter operation unit at least comprises a plurality of multipliers for receiving the line image data to perform a multiplication operation with the corresponding filter coefficients for outputting.

12. The image processing apparatus as claimed in claim 11 further comprising a storing buffer for receiving a part of the filter operated line image data, and feeding it back to the filter operation unit for accumulation operation, so as to obtain an integral image data for outputting.

13. The image processing apparatus as claimed in claim 12, wherein the filter operation unit further comprises an adder for accumulating data fed back from the storing buffer with the filter operated line image data, so as to obtain the integral image data for outputting.

14. The image processing apparatus as claimed in claim 1, wherein the image unit data is a pixel data, and the image data is composed of a plurality of the pixel data.

15. The image processing apparatus as claimed in claim 14, wherein the data buffer is a FIFO buffer for outputting pixel data corresponding to a number of the filter coefficients that are processed by the filter operation unit.

16. The image processing apparatus as claimed in claim 15, wherein the filter operation unit at least comprises a plurality of multipliers for receiving the pixel data to perform a multiplication operation with the corresponding filter coefficients for outputting.

17. The image processing apparatus as claimed in claim 16 further comprising a pixel storing buffer, for receiving the f pixel data after filter operation, and feeding the received pixel data back to the filter operation unit for accumulation operation, so as to obtain an integral image data for outputting.

18. The image processing apparatus as claimed in claim 17, wherein the filter operation unit further comprises an adder for accumulating data fed back from the storing buffer with the filter operated line image data, so as to obtain the integral image data for outputting.

* * * * *